US006839672B1

(12) United States Patent
Beutnagel et al.

(10) Patent No.: US 6,839,672 B1
(45) Date of Patent: Jan. 4, 2005

(54) INTEGRATION OF TALKING HEADS AND TEXT-TO-SPEECH SYNTHESIZERS FOR VISUAL TTS

(75) Inventors: Mark Charles Beutnagel, Mendham, NJ (US); Joern Ostermann, Red Bank, NJ (US); Ariel Fischer, Lausanne (CH); Yao Wang, Matawan, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/224,583

(22) Filed: Dec. 31, 1998

Related U.S. Application Data

(60) Provisional application No. 60/082,393, filed on Apr. 20, 1998, and provisional application No. 60/073,185, filed on Jan. 30, 1998.

(51) Int. Cl.[7] .................................................. G10L 13/08

(52) U.S. Cl. ......................... 704/260; 704/270; 704/275; 704/278

(58) Field of Search .................................. 704/260, 270, 704/275–278

(56) References Cited

U.S. PATENT DOCUMENTS

| | | | | |
|---|---|---|---|---|
| 4,884,972 | A | * 12/1989 | Gasper | 345/473 |
| 4,913,539 | A | * 4/1990 | Lewis | 352/5 |
| 5,884,267 | A | * 3/1999 | Goldenthal et al. | 704/270 |
| 6,028,960 | A | * 2/2000 | Graf et al. | 382/100 |
| 6,043,827 | A | * 3/2000 | Christian et al. | 345/474 |
| 6,052,132 | A | * 4/2000 | Christian et al. | 345/474 |
| 6,069,631 | A | * 5/2000 | Tao et al. | 345/418 |
| 6,112,177 | A | * 8/2000 | Cosatto et al. | 704/260 |
| 6,130,679 | A | * 10/2000 | Chen et al. | 345/473 |
| 6,177,928 | B1 | * 1/2001 | Basso et al. | 704/200 |
| 6,181,351 | B1 | * 1/2001 | Merrill et al. | 345/473 |
| 6,249,292 | B1 | * 6/2001 | Christian et al. | 345/473 |
| 6,279,017 | B1 | * 8/2001 | Walker | 707/526 |

OTHER PUBLICATIONS

Bothe, "Audio to Audio Video Speech Conversion with the Help of Phonetic Knowledge Intergration", IEEE, Jan. 1997, pp 1632–1637.*

Morishima et al, "An Intelligent Facial Image Coding Driven by Speech and Phoneme", pp 1795–1798, 1989, IEEE.*

Cheung etal, "Text–Driven Automatic Frame Generation using MPEG–4 Synthetic/Natural Hybrid Coding for 2–D Head and Shoulder Scene", pp 69–72, 1997, IEEE.*

* cited by examiner

*Primary Examiner*—W. R. Young
*Assistant Examiner*—Michael N Opsasnick
(74) *Attorney, Agent, or Firm*—Henry T. Brendzel

(57) ABSTRACT

An enhanced arrangement for a talking head driven by text is achieved by sending FAP information to a rendering arrangement that allows the rendering arrangement to employ the received FAPs in synchronism with the speech that is synthesized. In accordance with one embodiment, FAPs that correspond to visemes which can be developed from phonemes that are generated by a TTS synthesizer in the rendering arrangement are not included in the sent FAPs, to allow the local generation of such FAPs. In a further enhancement, a process is included in the rendering arrangement for creating a smooth transition from one FAP specification to the next FAP specification. This transition can follow any selected function. In accordance with one embodiment, a separate FAP value is evaluated for each of the rendered video frames.

18 Claims, 1 Drawing Sheet

INTEGRATION OF TALKING HEADS AND TEXT-TO-SPEECH SYNTHESIZERS FOR VISUAL TTS

REFERENCE TO A RELATED APPLICATION

This invention claims the benefit of provisional application No. 60/082,393, filed Apr. 20, 1998, titled "FAP Definition Syntax for TTS Input and of provisional application No. 60/073,185, filed Jan. 30, 1998, titled "Advanced TTS For Facial Animation."

BACKGROUND OF THE INVENTION

The success of the MPEG-1 and MPEG-2 coding standards was driven by the fact that they allow digital audiovisual services with high quality and compression efficiency. However, the scope of these two standards is restricted to the ability of representing audiovisual information similar to analog systems where the video is limited to a sequence of rectangular frames. MPEG-4 (ISO/IEC JTC1/SC29/WG11) is the first international standard designed for true multimedia communication, and its goal is to provide a new kind of standardization that will support the evolution of information technology.

MPEG-4 provides for a unified audiovisual representation framework. In this representation, a scene is described as a composition of arbitrarilyy shaped audiovisual objects (AVOs). These AVOs can be organized in a hierarchical fashion, and in addition to providing support for coding individual objects, MPEGA also provides facilities to compose that hierarchical structure.

One of these AVOs is the Face Object, which allows animation of synthetic faces, sometimes called Talking Heads. It consists of a 2D representation of a 3D synthetic visual object representing a human face, a synthetic audio object, and some additional information required for the animation of the face. Such a scene can be defined using the BInary Format for Scene (BIFS), which is a language that allows composition of 2D and 3D objects, as well as animation of the objects and their properties.

The face model is defined by BIFS through the use of nodes. The Face Animation Parameter node (FAP) defines the part of the face has to be animated. The Face Description Parameter node (FDP) defines the rules to animate the face model. The audio object can be natural audio, or created at the decoder with some proprietary Text-To-Speech (TTS) synthesize. In the case of an encoded stream containing natural audio, an independent FAP stream drives the animation, and time stamps included in the streams enable the synchronization between the audio and the animation. A synthesizer is a device that creates an output based on a set of inputs and a set of rules. Two different synthesizers that are subjected to different rules may generate perfectly acceptable but markedly different outputs in the response to a given set of inputs, such as one synthesizer might generate a talking head of a blond woman, while the other might generate a talking head of a dark haired woman.

A TTS is a system that accepts text as input, and outputs an intermediate signal that comprises phonemes, and a final signal that comprises audio samples corresponding to the text. MPEG-4 does not standardize the TTS Synthesizer, but it provides a Text-To-Speech Interface (TTSI). By sending text to the decoder, the animation is driven by the FAP stream and by the TTS.

MPEG-4 defines a set of 68 Face Animation Parameters (FAPs), each corresponding to a particular facial action that deforms a face from its neutral state. These FAPs are based on the study of minimal perceptible actions, and are closely related to muscle action. The value for a particular FAP indicates the magnitude of the corresponding action. The 68 parameters are categorized into 10 groups, as shown in Table 1 of the appendix. Other than the first group, all groups are related to different parts of the face. The first group contains two high-level parameters (FAP 1 and FAP2) visemes and expressions. A viseme is a visual version of a phoneme. It describes the visually distinguishable speech posture involving the lips, teeth and tongue. Different phonemes are pronounced with a very similar posture of the mouth, like "p" and "b" and, therefore, a single viseme can be related to more than one phoneme. Table 2 in the appendix shows the relation between visemes and their corresponding phonemes.

In order to allow the visualization of mouth movement produced by coarticulation, transitions from one viseme to the next are defined by blending the two visemes with a weighting factor that changes with time along some selected trajectory.

The expression parameter (FAP 2) defines 6 high level facial expressions, such as joy, sadness, anger, etc. They are described in Table 3 of the appendix. The nine other FAP groups, which represent FAP 3 to FAP 68, are low-level parameters, like move left mouth corner up.

Each FAP (except FAP1 and FAP2) is defined in a unit, which can vary from one parameter to another. Unlike visemes and expressions, each low-level FAP characterizes only a single action. Therefore, a low-level action is completely defined with only two numbers, the FAP number, and the amplitude of the action to apply. In the case of high-level parameters, a third number, called FAPselect, is required to determine which viseme (in case of FAP 1), or which expression (in case of FAP 2) is to be applied.

For each frame, the receiver applies and performs the deformations on the face model using all FAPs. Once all actions have been done on the model, the face is rendered.

MPEG-4 allows the receiver to use a proprietary face model with its own animation rules. Thus, the encoder sends signals to control the animation of the face by sending FAPs but has no knowledge concerning the size and proportion of the head to animate, or any other characteristic of the decoding arrangements. The decoder, for its part, needs to interpret the values of they in a way such that the FAPs produce reasonable deformation. Because the encoder is not aware of the decoder that will be employed, the MPEG-4 standard contemplates providing normalized FAP values in face animation parameter units (FAPU). The FAPU are computed from spatial distances between key facial features on the model in its neutral state, such as iris diameter, eye separation, eye-to-nose separation, Mouth-to-nose separation, and Mouth width.

FIG. 1 presents a block diagram of a prior art face rendering arrangement that employs the FAP information that is available with MPEG-4. It includes an audio signal on line 10 that is applied to decoder 100, and a FAP stream on line 11 that is applied to face rendering module (FRM) 110. Module 110 is conventional. It can be a separate piece of hardware, but often it is a software module that is executed on a processor. A face model and its animation rules may be applied to FRM 110 via line 12. While decoder 100 decodes the audio signal, FRM 110 concurrently renders the face based on the applied FAP stream. Compositor 130, responsive to synthesizer 120 and FRM 110, simultaneously plays the audio and the animated model video that result from applying the FAPs to FRM 110. Synchronization is achieved at the decoder by retrieving timing information from the streams. This timing information is of two types, and must be included in the transmitted streams. The first type is used to convey the speed of the encoder clock, while the second one consists of time stamps attached to portions of the encoded data.

Providing for this synchronization (between what is said and the desired facial expressions) on the encoder side is not trivial, and the problem is certainly not reduced when a TTS arrangement is contemplated. The reason lies in the fact that whereas faces are animated at constant frame rate, the timing behavior of a TTS Synthesizer on the decoder side is usually unknown. It is expected that there will be a very large number of commercial applications where it will be desirable to drive the animation from a text. Therefore, solving the synchronization problem is quite important.

SUMMARY OF THE INVENTION

An enhanced arrangement for a talking head driven by text is achieved by sending FAP information to a rendering arrangement that allows the rendering arrangement to employ the received FAPs in synchronism with the speech that is synthesized. In accordance with one embodiment, FAPs that correspond to visemes which can be developed from phonemes that are generated by a TTS synthesizer in the rendering arrangement are not included in the sent FAPS, to allow the local generation of such FAPs. In a further enhancement, a process is included in the rendering arrangement for creating a smooth transition from one FAP specification to the next FAP specification. This transition can follow any selected function. In accordance with one embodiment, a separate FAP value is evaluated for each of the rendered video frames.

DETAILED DESCRIPTION

Figure 1:
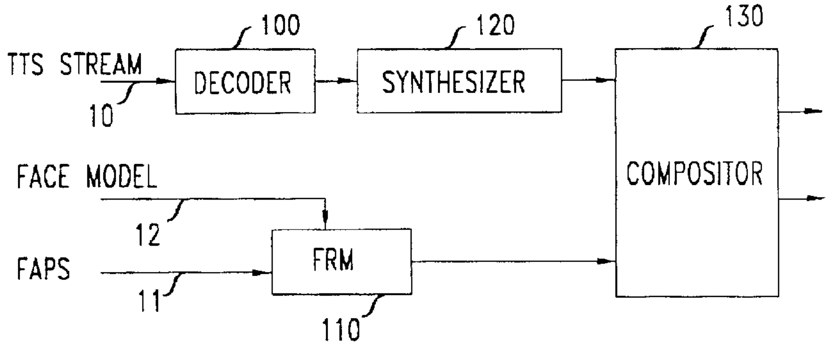
FIG. 1 depicts a prior art rendering arrangement that is useful for rendering a talking head from an audio stream and a separate FPAs stream.

FIG. 1 depicts a prior art rendering arrangement that receives signals from some encoder source and develops therefrom an audio signal and a talking head video. More specifically, the rendering arrangement of FIG. 1 is arranged to be useful for TTS systems as well as for natural audio. The difference between a natural audio system and a TTS system lies in element 100, which converts an incoming text string into speech. When element 100 is responsive to natural audio, it is effectively a decoder. When elements 100 is responsive to ASCII text, it is effectively a TTS synthesizer.

One enhancement that is possible, when employing the FIG. 1 arrangement to synthesize speech is to use the phoneme information (the phoneme's identity, its start time, and its duration) that is generated as an intermediate output of the TTS synthesizer to generate some viseme FAPs. The generated FAPs are assured to be fairly well synchronized with the synthesized speech and, additionally, the local generation of these FAPs obviates the need to have the encoder generate and send them. This enhanced arrangement is shown in FIG. 2, and it includes a phoneme to FAP converter 140 that is interposed between decoder 100 and FRM 110.

As indicated above, the synchronization between the generated visemes and the speech is fairly good. The only significant variable that is unknown to FRM 110 is the delay suffered between the time the phonemes are available and the time the speech signal is available. However, this delay can be measured and compensated in the terminal. By comparison, the synchronization between the incoming FAP stream and the synthesized speech is much more problematic. MPEG-4 does not specify a standard for the operation of TTS equipment, but specifies only a TTS Interface (TTSI). Therefore, the precise characteristics of the TTS synthesizer that may be employed in the FIG. 2 arrangement are not known. The encoder that generates the FAP stream does not know whether a receiving decoder 100 will create speech that is fast, or slow, at a constant rate or at some variable rate, in monotone or is "sing-song," etc. Consequently, synchronization between the FAP stream and the output of the TTS synthesize cannot be achieved.

We have concluded that a better approach for insuring synchronization between the TTS synthesizer 120 and the output of FRM 110 is to communicate prosody and timing information to TTS synthesizer 120 along with the text and in synchronism with it. In our experimental embodiment this is accomplished by sending the necessary FAPs stream (i.e., the entire FAPs stream, minus the viseme FAPs that would be generated locally by converter 140) embedded in the TTS stream. The FAPs information effectively forms bookmarks in the TTS ASCII stream that appears on line 10. The embedding is advantageously arranged so that a receiving end could easily cull out the FAP bookmarks from the incoming streams.

Figure 2:
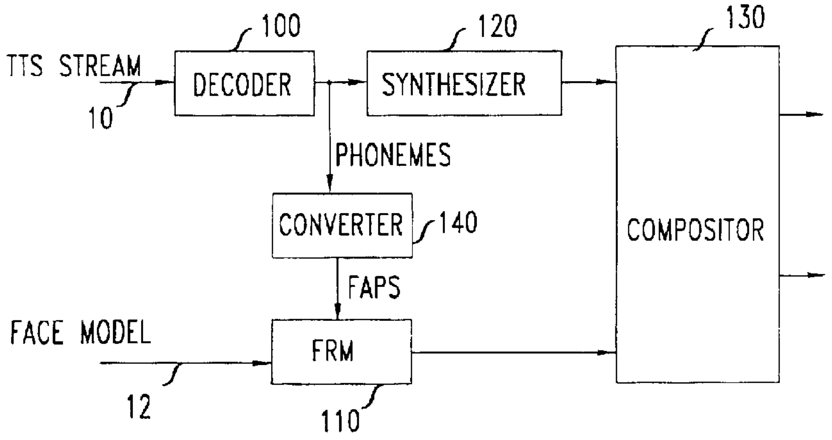
FIG. 2 presents an arrangement where phonemes developed by the TTS synthesizer of FIG. 1 are employed to develop visemes locally.
Figure 3:
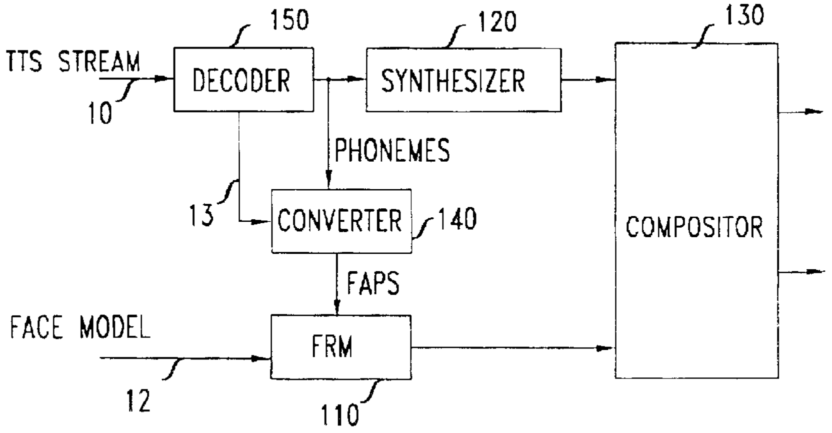
FIG. 3 shows an arrangement where FAP information is embedded in the incoming TTS stream.

This enhanced arrangement is shown in FIG. 3, which differs from FIG. 2 in that it includes an enhanced decoder, 150. Decoder 150 extracts the FAPs stream contained in the TTS stream on line 10 and applies the extracted FAPs stream to converter 140 via line 13. The function of converter 140 in FIG. 3 is expanded to not only convert phoneme information into FAPs but to also merge the developed FAPs with the FAPs that are extracted by decoder 150 from the incoming TTS stream and provided to converter 140.

Illustratively, the syntax of the FAPs bookmarks is <FAP # (FAPselect) FAPval FAPdur>, where the # is a number that specifies the FAP, in accordance with Table 4 in the appendix. When the # is a "1", indicating that it represents a viseme, the FAPselect number selects from Table 1. When the # is a "2", indicating that it represents an expression, the number selects from Table 2. FAPval specifies the magnitude of the FAP action, and FAPdur specifies the duration.

Simply applying a FAP of a constant value and removing it after a certain amount of time does not give a realistic face motion. Smoothly transitioning from one FAP specification to the next FAP specification is much better. Accordingly, it is advantageous to include a transitioning schema in the FIG. 3 arrangement; and in accordance with one such schema, the FAPval defines the value of the FAP to be applied at the end of FAPdur. The value of the FAP at the beginning of the action (startValue) depends on the previous value and can be equal to:

- 0 if the FAP bookmark sequence is the first one with this FAP #
- FAPval of the previously applied FAP, if a time longer than the previous FAPdur has elapsed between the two FAP specifications.

The actual reached value due to the previous FAP specification, if a time shorter than the previous JFAP-dur has elapsed between the two FAP specifications.

To reset the action, a FAP with FAPval equal to 0 may be applied.

While having a linear transition trajectory from one FAP to the next is much better than an abrupt change, we realized that any complex trajectory can be effected. This is achieved by specifying a FAP for each frame, and a function that specifies the transition trajectory from the FAP from frame to frame. For example, when synthesizing a phrase such as " . . . really? You don't say!" it is likely that an expression of surprise will be assigned to, or associated with, the word "really," and perhaps for some time after the next word, or words are synthesized. Thus, this expression may need to last for a second or more, but the FAP that specifies surprise is specified only once by the source.

A trajectory for fading of the previous expression and for establishment of the "surprise" expression needs to be developed for the desired duration, recognizing that the next expression may be specified before the desired duration expires, or some time after the desired duration expires. Furthermore, for real-time systems it is advantageous if the current shape of the face can be processed from information available up to this moment and does not depend on information available in the future or after significant delay. This requirement prevents us from using splines where knowledge of future points is necessary in order to guarantee smooth transitions. Thus, the FIG. 3 rendering arrangement needs choose the aforementioned trajectory. In accordance with this invention, any desired trajectory can be established from the starting time throughout the FAPdur interval, and beyond. One way to accomplish this is to select a function that is evaluated at every frame to yield strength, or magnitude, of the expression (e.g., big smile, or small smile) at every frame that is rendered. The function can be linear, as described above, but it can also be a non-linear function. Of course, one need not and restrict oneself to use only some selected function. That is, going from expression A to expression B need not follow a function that is the same as the function followed when going from expression B to expression C.

We have identified a number of useful transition trajectory functions. They are:

$$f(t)=a_s+(a-a_s)t; \tag{1}$$

$$f(t)=a_s+(1-e^{-1})(a-a_s), \tag{2}$$

$$f(t)=a_s+\frac{(a-a_s)}{1-e^{-\lambda\left(t-\frac{FAPdur}{2}\right)}},\text{ and} \tag{3}$$

$$f(t)=a_s(2t^3-3t^2+1)+(-2t^3+3t^2)a+(t^3-2t^2+t)g_s, \tag{4}$$

with t=[0,1], the amplitude $a_s$ at the beginning of the FAP, at t=0, control parameter λ and the gradient $g_s$ of f(0) with is the FAP amplitude overmeat t=0. If the transition time T≠1, the time axis of the functions need to be scaled. Since these functions depend only on $a_s$, λ, $g_s$, and T, and thus are completely determined as soon as the FAP bookmark is known.

The most important criterion for selecting a transition trajectory function is the resulting quality of the animation. Experimental results suggest that when linear interpolation is used, and when equation (2) is used, sharp transitions result in the combined transition trajectory, which do not result in a realistic rendering for some facial motions. Equations (3) and (4) yield better results. On balance, we have concluded that the function of equation (4) order gives the best results, in terms of realistic behavior and shape prediction. This function enables one to match the tangent at the beginning of a segment with the tangent at the end of the previous segment, so that a smooth curve can be guaranteed. The computation of this function requires 4 parameters as input, which are: the value of the first point of the curve (startVal), its tangent (startTan), the value to be reached at the end of the curve (equal to FAPVal) and its tangent.

For each FAP #, the first curve (due to FAP # bookmark$_{i=0}$) has a starting value of 0 (startVal$_{i=0}$=0) and a starting tangent of 0 (startTan$_{i=0}$=0). The value for startTan and startVal for i>0 depends on $t_{i-1,i}$, which is the time elapsed between FAP # bookmark$_{i-1}$ and FAP # bookmark$_i$. Thus, in accordance with one acceptable schema, If $t_{i-1,i}$>FAPdur$_{i-1}$ then:

$$startVal_i=FAPval_{i-1}$$

$$stariTan_i=0$$

and the resulting amplitude of the FAP to be sent to the renderer is computed with equation (5):

$$\underset{i}{FAPAmp}(t)=\underset{i}{startVal}\cdot(2t^3-3t^2+1)+\underset{i}{FAPval}\cdot(-2t^3+3t^2)+\underset{i}{start}\text{Tan}\cdot(t^3-2t^2+1)\text{ with }t\in[0,1] \tag{5}$$

FAPdur$_i$ is used to relocate and scale the time parameter, t, from [0 1] to [$t_i$,$t_i$+FAPdur$_i$] with $t_i$ being the instant when the word following FAP # bookmark$_i$ in the text is pronounced. Equation (6) gives the exact rendering time:

$$\text{Rendering time for }FAPAmp_i(t)=t_i+t\cdot FAPdur_i. \tag{6}$$

If $t_{i-1,i}$<FAPdur$_{i-1}$ then:

$$startVal_i=FAPAmp_{i-1}(t_{i-1,i}/FAPdur_{i-1})$$

$$startTan_i=tan_{i-1}(t_{i-1,i}/FAPdur_{i-1})$$

which is computed with equation (3):

$$\underset{i-1}{\tan}(t)=\underset{i-1}{startVal}\cdot(6t^2-6t)+\underset{i-1}{FAPval}\cdot(-6t^2+6t)+\underset{i-1}{start}\text{Tan}\cdot(3t^2-4t+1)\text{ with }t\in[0\ 1] \tag{7}$$

and the resulting amplitude of the FAP is again computed with equation (5).

Thus, even if the user does not estimate properly the duration of each bookmark, the equation (4) function, more than any other function investigated, would yield the smoothest overall resulting curve.

The above disclosed a number of principles and presented an illustrative embodiment. It should be understood, however, that skilled artisans can make various modifications without departing from the spirit and scope of this invention. For example, while the functions described by equations (1) through (4) are monotonic, there is no reason why an expression from its beginning to its end must be monotonic. One can imagine, for example, that a person might start a smile, freeze it for a moment, and then proceed with a broad smile. Alternatively, one might conclude that a smile that is longer than a certain time will appear too stale, and would want the synthesized smile to reach a peak and then reduce somewhat. It also possible to define triangle function in order to easily describe motions like an eye blink. Any such modulation can be effected by employing other functions, or by dividing the duration into segments, and applying different functions, or different target magnitudes at the different segments.

Appendix

TABLE 1

FAP groups

| Group | Number of FAPs |
|---|---|
| 1: visemes and expressions | 2 |
| 2: jaw, chin, inner lowerlip, cornerlips, midlip | 16 |
| 3: eyeballs, pupils, eyelids | 12 |
| 4: eyebrow | 8 |
| 5: cheeks | 4 |
| 6: tongue | 5 |
| 7: head rotation | 3 |
| 8: outer lip positions | 10 |
| 9: nose | 4 |
| 10: ears | 4 |

TABLE 2

Visemes and related phonemes

| Viseme # | phonemes | example |
|---|---|---|
| 0 | none | na |
| 1 | p, b, m | put, bed, mill |
| 2 | f, v | far, voice |
| 3 | T, D | think, that |
| 4 | t, d | tip, doll |
| 5 | k, g | call, gas |
| 6 | tS, dZ, S | chair, join, she |
| 7 | s, z | sir, zeal |
| 8 | n, l | lot, not |
| 9 | r | red |
| 10 | A: | car |
| 11 | e | bed |
| 12 | I | tip |
| 13 | Q | top |
| 14 | U | book |

TABLE 3

Facial expressions defined for FAP 2.

| # | expression name | textual description |
|---|---|---|
| 1 | joy | The eyebrows are relaxed. The mouth is open and the mouth corners pulled back toward the ears. |
| 2 | sadness | The inner eyebrows are bent upward. The eyes are slightly closed. The mouth is relaxed. |
| 3 | anger | The inner eyebrows are pulled downward and together. The eyes are wide open. The lips are pressed against each other or opened to expose the teeth. |
| 4 | fear | The eyebrows are raised and pulled together. The inner eyebrows are bent upward. The eyes are tense and alert. |
| 5 | disgust | The eyebrows and eyelids are relaxed. The upper lip is raised and curled, often asymmetrically. |
| 6 | surprise | The eyebrows are raised. The upper eyelids are wide open, the lower relaxed. The jaw is opened. |

TABLE 4

FAP definitions, group assignments, and step sizes.
FAP names may contain letters with the following meaning:
l = left, r = right, t = top, b = bottom, I = inner, o = outer, m = middle.
Column A is in units
Column B is in uni- or bi-directional
Column C is Positive Motion
Column D is FAP group, and
Columns E is Quantizer step size

| # | FAP name | FAP description | A | B | C | D | E |
|---|---|---|---|---|---|---|---|
| 1 | viseme | Set of values determining the mixture of two visemes for this frame (e.g. pbm, fv, th) | na | na | na | 1 | 1 |
| 2 | expression | A set of values determining the mixture of two facial expression | na | na | na | 1 | 1 |
| 3 | open_jaw | Vertical jaw displacement (does not affect mouth opening) | MNS | U | down | 2 | 4 |
| 4 | lower_t_midlip | Vertical top middle inner lip displacement | MNS | B | down | 2 | 2 |
| 5 | raise_b_midlip | Vertical bottom middle inner lip displacement | MNS | B | up | 2 | 2 |
| 6 | stretch_l_cornerlip | Horizontal displacement of left inner lip corner | MW | B | left | 2 | 2 |
| 7 | stretch_r_cornerlip | Horizontal displacement of right inner lip corner | MW | B | right | 2 | 2 |
| 8 | lower_t_lip_lm | Vertical displacement of midpoint between left corner and middle of top inner lip | MNS | B | down | 2 | 2 |
| 9 | lower_t_lip_rm | Vertical displacement of midpoint between right corner and middle of top inner lip | MNS | B | down | 2 | 2 |
| 10 | raise_b_lip_lm | Vertical displacement of midpoint between left corner and middle of bottom inner lip | MNS | B | up | 2 | 2 |
| 11 | raise_b_lip_rm | Vertical displacement of midpoint between right corner and middle of bottom inner lip | MNS | B | up | 2 | 2 |
| 12 | raise_l_cornerlip | Vertical displacement of left inner lip corner | MNS | B | up | 2 | 2 |
| 13 | raise_r_cornerlip | Vertical displacement of right | MNS | B | up | 2 | 2 |

TABLE 4-continued

FAP definitions, group assignments, and step sizes.
FAP names may contain letters with the following meaning:
l = left, r = right, t = top, b = bottom, I = inner, o = outer, m = middle.
Column A is in units
Column B is in uni- or bi-directional
Column C is Positive Motion
Column D is FAP group, and
Columns E is Quantizer step size

| # | FAP name | FAP description | A | B | C | D | E |
|---|---|---|---|---|---|---|---|
| | | inner lip corner | | | | | |
| 14 | thrust__jaw | Depth displacement of jaw | MNS | U | forward | 2 | 1 |
| 15 | shift__jaw | Side to side displacement of jaw | MNS | B | right | 2 | 1 |
| 16 | push__b__lip | Depth displacement of bottom middle lip | MNS | B | forward | 2 | 1 |
| 17 | push__t__lip | Depth displacement of top middle lip | MNS | B | forward | 2 | 1 |
| 18 | depress__chin | Upward and compressing movement of the chin (like in sadness) | MNS | B | up | 2 | 1 |
| 19 | close__t__l__eyelid | Vertical displacement of top left eyelid | IRISD | B | down | 3 | 1 |
| 20 | close__t__r__eyelid | Vertical displacement of top right eyelid | IRISD | B | down | 3 | 1 |
| 21 | close__b__l__eyelid | Vertical displacement of bottom left eyelid | IRISD | B | up | 3 | 1 |
| 22 | close__b__r__eyelid | Vertical displacement of bottom right eyelid | IRISD | B | up | 3 | 1 |
| 23 | yaw__l__eyeball | Horizontal orientation of left eyeball | AU | B | left | 3 | 128 |
| 24 | yaw__r__eyeball | Horizontal orientation of right eyeball | AU | B | left | 3 | 128 |
| 25 | pitch__l__eyeball | Vertical orientation of left eyeball | AU | B | down | 3 | 128 |
| 26 | pitch__r__eyeball | Vertical orientation of right eyeball | AU | B | down | 3 | 128 |
| 27 | thrust__l__eyeball | Depth displacement of left eyeball | IRISD | B | forward | 3 | 1 |
| 28 | thrust__r__eyeball | Depth displacement of right eyeball | IRISD | B | forward | 3 | 1 |
| 29 | dilate__l__pupil | Dilation of left pupil | IRISD | U | growing | 3 | 1 |
| 30 | dilate__r__pupil | Dilation of right pupil | IRISD | U | growing | 3 | 1 |
| 31 | raise__l__i__eyebrow | Vertical displacement of left inner eyebrow | ENS | B | up | 4 | 2 |
| 32 | raise__r__i__eyebrow | Vertical displacement of right inner eyebrow | ENS | B | up | 4 | 2 |
| 33 | raise__l__m__eyebrow | Vertical displacement of left middle eyebrow | ENS | B | up | 4 | 2 |
| 34 | raise__r__m__eyebrow | Vertical displacement of right middle eyebrow | ENS | B | up | 4 | 2 |
| 35 | raise__l__o__eyebrow | Vertical displacement of left outer eyebrow | ENS | B | up | 4 | 2 |
| 36 | raise__r__o__eyebrow | Vertical displacement of right outer eyebrow | ENS | B | up | 4 | 2 |
| 37 | squeeze__l__eyebrow | Horizontal displacement of left eyebrow | ES | B | right | 4 | 1 |
| 38 | squeeze__r__eyebrow | Horizontal displacement of right eyebrow | ES | B | left | 4 | 1 |
| 39 | puff__l__cheek | Horizontal displacement of left cheeck | ES | B | left | 5 | 2 |
| 40 | puff__r__cheek | Horizontal displacement of right cheeck | ES | B | right | 5 | 2 |
| 41 | lift__l__cheek | Vertical displacement of left cheek | ENS | U | up | 5 | 2 |
| 42 | lift__r__cheek | Vertical displacement of right cheek | ENS | U | up | 5 | 2 |
| 43 | shift__tongue__tip | Horizontal displacement of tongue tip | MW | B | right | 6 | 1 |
| 44 | raise__tongue__tip | Vertical displacement of tongue tip | MW | B | up | 6 | 1 |
| 45 | thrust__tongue__tip | Depth displacement of tongue tip | MW | B | forward | 6 | 1 |
| 46 | raise__tongue | Vertical displacement of tongue | MW | B | up | 6 | 1 |
| 47 | tongue__roll | Rolling of the tongue into U shape | AU | U | concave upward | 6 | 512 |
| 48 | head__pitch | Head pitch angle from top of spine | AU | B | down | 7 | 128 |
| 49 | head__yaw | Head yaw angle from top of spine | AU | B | left | 7 | 128 |
| 50 | head__roll | Head roll angle from top of spine | AU | B | right | 7 | 128 |
| 51 | lower__t__midlip__o | Vertical top middle outer lip displacement | MNS | B | down | 8 | 2 |
| 52 | raise__b__midlip__o | Vertical bottom middle outer lip displacement | MNS | B | up | 8 | 2 |
| 53 | stretch__l__cornerlip__o | Horizontal displacement of left outer lip corner | MW | B | left | 8 | 2 |
| 54 | stretch__r__cornerlip__o | Horizontal displacement of right outer lip corner | MW | B | right | 8 | 2 |
| 55 | lower__t__lip__lm__o | Vertical displacement of midpoint between left corner and middle of top outer lip | MNS | B | down | 8 | 2 |
| 56 | lower__t__lip__rm__o | Vertical displacement of midpoint between right corner and middle of top outer lip | MNS | B | down | 8 | 2 |
| 57 | raise__b__lip__lm__o | Vertical displacement of midpoint between left corner and middle of bottom outer lip | MNS | B | up | 8 | 2 |
| 58 | raise__b__lip__rm__o | Vertical displacement of midpoint between right corner and middle of bottom outer lip | MNS | B | up | 8 | 2 |
| 59 | raise__1__cornerlip__o | Vertical displacement of left outer lip corner | MNS | B | up | 8 | 2 |
| 60 | raise__r__cornerlip__o | Vertical displacement of right outer lip corner | MNS | B | up | 8 | 2 |
| 61 | stretch__l__nose | Horizontal displacement of left side of nose | ENS | B | left | 9 | 1 |
| 62 | stretch__r__nose | Horizontal displacement of right side of nose | ENS | B | right | 9 | 1 |
| 63 | raise__nose | Vertical displacement of nose tip | ENS | B | up | 9 | 1 |
| 64 | bend__nose | Horizontal displacement of nose tip | ENS | B | right | 9 | 1 |
| 65 | raise__l__ear | Vertical displacement of left ear | ENS | B | up | 10 | 1 |
| 66 | raise__r__ear | Vertical displacement of right ear | ENS | B | up | 10 | 1 |
| 67 | pull__l__ear | Horizontal displacement of left ear | ENS | B | left | 10 | 1 |
| 68 | pull__r__ear | Horizontal displacement of right ear | ENS | B | right | 10 | 1 |

We claim:

1. A method comprising the steps of:

receiving an input signal that comprises text signals representing audio and embedded video synthesis command signals;

separating said input signal into an audio signal stream and a video synthesis command signals stream;

converting said text signal stream into phonemes and synthesizing speech from said phonemes, and developing a plurality of additional command signals and interposing the additional command signals into said video synthesis command signals stream to form a combined command signals stream; and synthesizing at least one image from said video synthesis command signals stream with aid of a FAP-based face model;

where said step of developing develops a set of said additional command signals between each pair of said command signals of said combined command signals stream, and said set of additional command signals interpolated between said pair of said command signals of said combined command signals stream; and where said interpolation is in accord with a function of order greater than 2.

2. The method of claim 1 where said interpolation is in accord with a function of order 4.

3. Apparatus comprising:

a decoder, responsive to an input signal comprising signals representing audio and embedded video synthesis command signals, that separates the command signals from the signals representing audio, and converts text signals found in said audio into phoneme signals, to develop thereby an audio signal stream and a first set of video synthesis command signals stream;

a converter for generating a second set of video synthesis command signals from said phoneme signals;

a speech synthesizer responsive to said audio signal stream for developing sound; and a video synthesizer responsive to said video synthesis command signals stream for developing images.

4. The apparatus of claim 3 where said converter is interposed between said decoder and said video synthesizer, merging said command signals separated from said input signal with said command signals generated by said converter, to form a single stream of input-signal-related command signals that is applied to said video synthesizer.

5. The apparatus of claim 4 where said converter generates additional command signals interposed between said input-signal-related command signals.

6. The apparatus of claim 3 where said video synthesis command signal are FAPs, and said video synthesis command signals generated by said converter are FAPs.

7. The apparatus of claim 6 where said video synthesis command signals generated by said converter are members of the FAP 1 parameter.

8. The apparatus of claim 6 where said video synthesis command signals generated by said converter are members of the FAP 1 parameter or FAP3-48 parameters, inclusively.

9. Apparatus comprising a decoder/synthesize module that is responsive to an input stream that includes a text specification commingled with explicit FAP information, in the form of interspersed bookmarks, each conveying information about identity of a FAP and an ultimate state that the FAP reaches in accordance with a specified transition path, outputting a synthesized voice at a first output, and phonemes as well as said FAP information at a second output;

a converter responsive to said second output for generating a sequence of facial animation parameters;

face rendering module responsive to said converter; and a compositor, responsive to said synthesizer and to said face rendering module;

where the transition path follows the equation $f(t)=a_s+(a-a_x)t$, where $a_x$ is amplitude measure at beginning of transition, a is specified in said bookmark, and t is time, ranging between 0 and 1, or a transition path that involves higher powers of t or e raised to power t.

10. The apparatus of claim 9 where the transition path follows the equation $f(t)=a_s+(1-e^{-1})(a-a_s)_t$, where $a_s$ is amplitude measure at beginning of transition, a is specified in said bookmark, and t is time, ranging between 0 and 1.

11. The apparatus of claim 9 where the transition path follows the equation $$f(t) = a_s + \frac{(a - a_s)}{1 - e^{-\lambda(t - FAPdur/2)}},$$

where $a_s$ is amplitude measure at beginning of transition, a is specified in said bookmark, FABdur is specified in said bookmark, l is a specified parameter, and t is time, ranging between 0 and 1.

12. The apparatus of claim 9 where the transition path follows the equation $f(t)=a_s+(2t^3-3t^2+1)+(-2t^3+3t^2)a+(t^3-2t^2+t)g_s$, where $a_s$ is amplitude measure at beginning of transition, a is specified in said bookmark, $g_s$ is a specified parameter, and t is time, ranging between 0 and 1.

13. The apparatus of claim 9 where the FAP amplitude transition path follows the equation $$FAPAmp(t) = \underset{i}{startVal}(2t^3 - 3t^2 + 1) + \underset{i}{FAPval}(-2t^3 + 3t^2) + start\mathrm{Tan}(\underset{i}{t^3} - 2t^2 + 1),$$

where startVal, FAPval, and startVan, are specified constants.

14. A method comprising the steps of:

receiving an input that includes a text specification commingled with explicit FAP information in the form of interspersed bookmarks, each conveying information about identity of a FAP and an ultimate state that the FAP reaches in accordance with a specified transition path, outputting a synthesized voice at a first output, and phonemes as well as said FAP information at a second output generating a sequence of facial animation parameters from signals of said second output;

rendering images from output signals developed by said step of generating; and combining said synthesized voice and said images;

where the transition path follows the equation $f(t)=a_N+(a-a_s)t$, where $a_s$ is amplitude measure at beginning of transition, a is specified in said bookmark, and t is time, ranging between 0 and 1, or a transition path that involves higher powers of t or e raised to power t.

15. The method of claim 14 where the transition path follows the equation $f(t)=a_s+(1-e^{-1})(a-a_s)$, where $a_s$ is amplitude measure at beginning of transition, a is specified in said bookmark, and t is time, ranging between 0 and 1.

16. The method of claim 14 where the transition path follows the equation $$f(t) = a_s + \frac{(a - a_s)}{1 - e^{-\lambda(t - FAPdur/2)}},$$

where $a_s$ is amplitude measure at beginning of transtition, a is specified in said bookmark, FABdur is specified in said bookmark, l is a specified parameter, and t is time, ranging between 0 and 1.

17. The method of claim 14 where the transition path follows the equation $f(t)=a_s+(2t^3-3t^2+1)+(-2t^3+3t^2)a+(t^3-2t^2+t)g_s$, where $a_s$ is amplitude measure at beginning of transition, a is specified in said bookmark, $g_s$ is a specified parameter, and t is time, ranging between 0 and 1.

18. The method of claim 14 where the FAP amplitude transition path follows the equation $$FAPAmp(t) = \underset{i}{startVal}(2t^3 - 3t^2 + 1) + \underset{i}{FAPval}(-2t^3 + 3t^2) + start\mathrm{Tan}(\underset{i}{t^3} - 2t^2 + 1),$$

where startVal, FAPval, and startTan, are specified constants.

* * * * *